(12) United States Patent
Tsujii et al.

(10) Patent No.: US 9,354,042 B2
(45) Date of Patent: May 31, 2016

(54) COORDINATE MEASURING SYSTEM, COORDINATE MEASURING METHOD, AND PROBE

(71) Applicant: MITUTOYO CORPORATION, Kanagawa (JP)

(72) Inventors: Masaharu Tsujii, Kanagawa (JP); Satoko Mori, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 14/700,514

(22) Filed: Apr. 30, 2015

(65) Prior Publication Data

US 2015/0323308 A1 Nov. 12, 2015

(30) Foreign Application Priority Data

May 7, 2014 (JP) ................ 2014-095943

(51) Int. Cl.
*G01B 11/14* (2006.01)
*G01B 11/00* (2006.01)

(52) U.S. Cl.
CPC .................... *G01B 11/005* (2013.01)

(58) Field of Classification Search
CPC ............. G01N 21/55; G01N 21/9501; G01N 2021/6419; G01N 2021/6421; G01N 2021/6441; G01N 2021/8825; G01N 21/64; G01N 21/6428; G01N 21/6458; G02B 27/1066; G02B 27/14; G02B 17/023; G02B 17/06

See application file for complete search history.

(56) References Cited

U.S. PATENT DOCUMENTS

| 5,622,170 A | * | 4/1997 | Schulz ................ A61B 5/0064 356/141.1 |
| 2011/0267431 A1 | | 11/2011 | Steinbichler et al. |
| 2012/0262695 A1 | * | 10/2012 | Faul ......................... G01C 3/08 356/3.13 |
| 2015/0061509 A1 | * | 3/2015 | Karlicek ............ G06K 9/00369 315/153 |

FOREIGN PATENT DOCUMENTS

JP 2011-237430 11/2011

* cited by examiner

*Primary Examiner* — Michael P Stafira
(74) *Attorney, Agent, or Firm* — Greenblum & Bernstein, P.L.C.

(57) ABSTRACT

A coordinate measuring system includes a probe provided with first to ninth infrared LEDs, and an image capture apparatus and calculation controller detecting the position of the probe. The probe includes a distance obtainer acquiring distance data for a distance from the probe to the image capture apparatus; and an illumination controller controlling an illumination time of the first to ninth infrared LEDs based on the distance represented by the distance data.

5 Claims, 9 Drawing Sheets

COORDINATE MEASURING SYSTEM, COORDINATE MEASURING METHOD, AND PROBE

CROSS-REFERENCE TO RELATED APPLICATIONS

The present application claims priority under 35 U.S.C. §119 of Japanese Application No. 2014-095943, filed on May 7, 2014, the disclosure of which is expressly incorporated by reference herein in its entirety.

BACKGROUND OF THE INVENTION

1. Field of the Invention

The present invention relates to a coordinate measuring system, coordinate measuring method, and a probe.

2. Description of Related Art

Conventionally, configurations measuring three-dimensional coordinates of a work piece are known (see, for example, Japanese Patent Laid-open Publication No. 2011-237430). A device according to Japanese Patent Laid-open Publication No. 2011-237430 includes a scanner acquiring object data of an object's surface; a tracking system determining a position and orientation of the scanner and acquiring position data for the scanner; and a controller determining three-dimensional coordinates of the object's surface using the object data and the position data.

The scanner and the controller each include a transceiver. The scanner wirelessly transmits the object data to the controller via the transceiver. The scanner includes a plurality of IR (infrared) detectors. The tracking system includes three IR sensors, each of which includes an optical device and a CCD sensor. With the IR sensors, the tracking system picks up a signal from the IR detectors, which are alternatingly activated, and the tracking system determines the position of each IR detector. In addition, the tracking system determines the position and orientation of the scanner using the position of each IR detector, and transmits the position data to the controller. Energy supply to the scanner and transceiver is performed by a battery capable of being carried by a person.

In the configuration described in Japanese Patent Laid-open Publication No. 2011-237430, a signal reception strength (intensity of received light) of a signal (infrared beam) from the IR detector increases in the IR sensor as a distance from the IR detector to the IR sensor decreases. In addition, an amount of infrared light that must be received in order to determine the position and the like of the scanner is defined ahead of time. Therefore, in a case where the distance from the IR detector to the IR sensor is short, even after the IR sensor receives the necessary amount of infrared light to determine the position, for example, the IR detector will continue to emit infrared light, wasting electricity.

SUMMARY OF THE INVENTION

An advantage of the present invention is to provide a coordinate measuring system, coordinate measuring method, and probe capable of inhibiting power consumption by a measurement light source.

The coordinate measuring system according to the present invention includes a probe provided with a measurement light source and capable of being moved to a desired position; and a position detection apparatus receiving light from the measurement light source and detecting the position of the probe. The position detection apparatus includes an image capture apparatus and a calculation control device. The image capture apparatus includes a pair of first optical systems provided so as to be separated from each other and collecting the light from the measurement light source on a first axis; a pair of first line sensors receiving the light collected on the first axis by the pair of first optical systems and detecting a first brightness distribution on the first axis; a second optical system collecting light from the measurement light source on a second axis orthogonal with respect to the first axis; and a second line sensor receiving the light collected on the second axis by the second optical system and detecting a second brightness distribution on the second axis. The calculation control device includes a position calculator calculating position data representing the position of the probe based on the first brightness distribution and the second brightness distribution. One of the probe and the calculation control device includes a distance obtainer acquiring distance data for a distance from the probe to the image capture apparatus; and an illumination controller controlling an illumination time of the measurement light source based on the distance represented by the distance data.

The coordinate measuring method according to the present invention utilizes a probe provided with a measurement light source and capable of being moved to a desired position; and a position detection apparatus receiving light from the measurement light source and detecting the position of the probe. The position detection apparatus is configured by an image capture apparatus and a calculation control device. The image capture apparatus includes a pair of first optical systems provided so as to be separated from each other and collecting the light from the measurement light source on a first axis; a pair of first line sensors receiving the light collected on the first axis by the pair of first optical systems and detecting a first brightness distribution on the first axis; a second optical system collecting light from the measurement light source on a second axis orthogonal with respect to the first axis; and a second line sensor receiving the light collected on the second axis by the second optical system and detecting a second brightness distribution on the second axis. One of the probe and the calculation control device executes acquiring distance data for a distance from the probe to the image capture apparatus; controlling an illumination time of the measurement light source based on the distance represented by the distance data; and calculating position data representing the position of the probe based on the first brightness distribution and the second brightness distribution.

According to this configuration, one of the probe and the calculation control device acquires the distance data for the distance from the probe to the image capture apparatus and controls the illumination time of the measurement light source based on the distance represented by the distance data. In addition, the first and second line sensors of the image capture apparatus detect the first brightness distribution and the second brightness distribution, respectively, by receiving light from the measurement light source of the probe, and the calculation control device calculates the position data of the probe based on the first brightness distribution and second brightness distribution. Therefore, in a case where the distance from the probe to the image capture apparatus is less than a predetermined distance and the intensity of light received in the first and second line sensors is greater than in a case where the distance is equal to the predetermined distance, the illumination time of the measurement light source is made shorter than in the case where the distance is equal to the predetermined distance. As a result, after the first and second line sensors have received an amount of light necessary for the calculation of the position data, the measurement light source can be turned off. Accordingly, power consumption by the measurement light source can be inhibited.

In the coordinate measuring system according to the present invention, the calculation control device preferably includes a first wireless communication portion; and a reference time transmitter transmitting, via the first wireless communication portion, reference illumination time data representing a reference amount of time to illuminate the measurement light source. The probe preferably includes a second wireless communication portion; a power supply capable of being moved to a desired position; the distance obtainer; and the illumination controller. The power supply preferably supplies electric power to the measurement light source, the second wireless communication portion, the distance obtainer, and the illumination controller. The illumination controller preferably obtains the reference illumination time data via the second wireless communication portion, corrects the reference illumination time based on the distance represented by the distance data, and controls the illumination time of the measurement light source based on the correction results.

According to this configuration, electric power is supplied to structural elements of the probe by the power supply, which is capable of being moved to a desired position. In addition, the probe acquires the reference illumination time data using wireless communication with the calculation control device and corrects the reference illumination time represented by the reference illumination time data based on the distance represented by the distance data. The probe then controls the illumination time of the measurement light source based on the measurement results. By correcting the reference illumination time in the probe in this way, a processing load on the calculation control device can be reduced. In addition, electric power is supplied to the structural elements of the probe by the power source, which is capable of being moved, and the reference illumination time data is transmitted and received between the calculation control device and the probe using wireless communication. Therefore, the position of the probe relative to the calculation control device can be freely adjusted within a range where wireless communication is possible, enabling work pieces having various sizes and shapes to be measured. Moreover, the power consumption of the power supply can be inhibited, and frequency of charging or swapping out the power source can be minimized.

In the coordinate measuring system according to the present invention, the image capture apparatus preferably includes a third wireless communication portion; and a measurement signal transmitter transmitting the measurement signal via the third wireless communication portion. The probe preferably includes a distance measurer measuring a distance from the probe to the image capture apparatus and generating the distance data based on the signal reception strength of the measurement signal in the second wireless communication portion.

According to this configuration, the distance from the probe to the image capture apparatus is measured based on the signal reception strength of the measurement signal transmitted and received between the probe and the image capture apparatus. Therefore, the illumination time of the measurement light source can be appropriately controlled based on accurate measurement results. In addition, the second wireless communication portion used in receiving the reference illumination time data is also used in receiving the measurement signal. As a result, the second wireless communication portion can be effectively utilized. Moreover, there is no need for an operator to measure the distance from the probe to the image capture apparatus, and a work burden on the operator can be alleviated.

The probe according to the present invention is utilized in a coordinate measuring system that includes a probe provided with a measurement light source and capable of being moved to a desired position; and a position detection apparatus receiving light from the measurement light source and detecting the position of the probe, the position detection apparatus being configured by an image capture apparatus and a calculation control device. The probe includes a second wireless communication portion capable of wireless communication with a first wireless communication portion, which is provided to the calculation control device; a power supply capable of being moved to a desired position; a distance obtainer acquiring distance data for a distance from the probe to the image capture apparatus; and an illumination controller controlling an illumination time of the measurement light source based on a distance represented by the distance data. The power supply supplies electric power to the measurement light source, the second wireless communication portion, the distance obtainer, and the illumination controller. The illumination controller obtains, via the second wireless communication portion, reference illumination time data transmitted from the first wireless communication portion and representing a reference amount of time to illuminate the measurement light source; corrects the reference illumination time based on the distance represented by the distance data; and controls the illumination time of the measurement light source based on the correction results.

A favorable probe can be provided to the above-described coordinate measuring system using this configuration.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Configuration of Coordinate Measuring System

Figure 1:
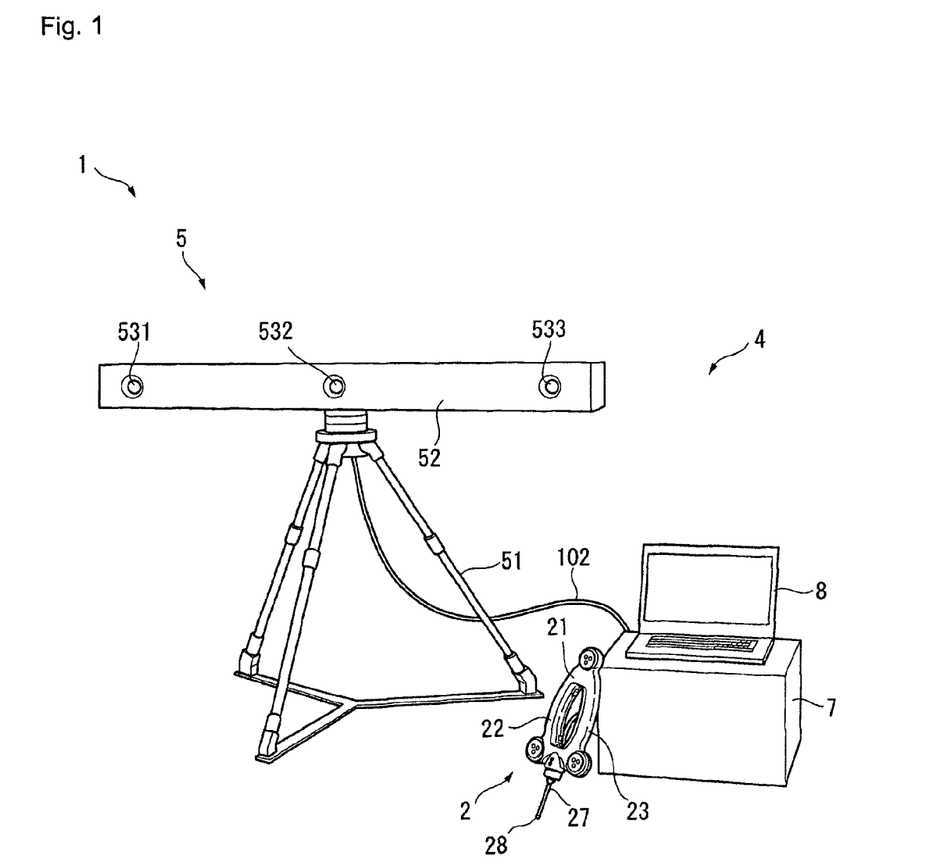
FIG. 1 is a perspective view of a coordinate measuring system according to a first embodiment of the present invention.

As shown in FIG. 1, a coordinate measuring system 1 according to the present embodiment includes a probe 2 as a measured body and a position detection apparatus (position detector) 4. The position detection apparatus (position detector) 4 includes an image capture apparatus (image capturer) 5, a calculation control device (calculation controller) 7, and a display device 8.

Figure 2:
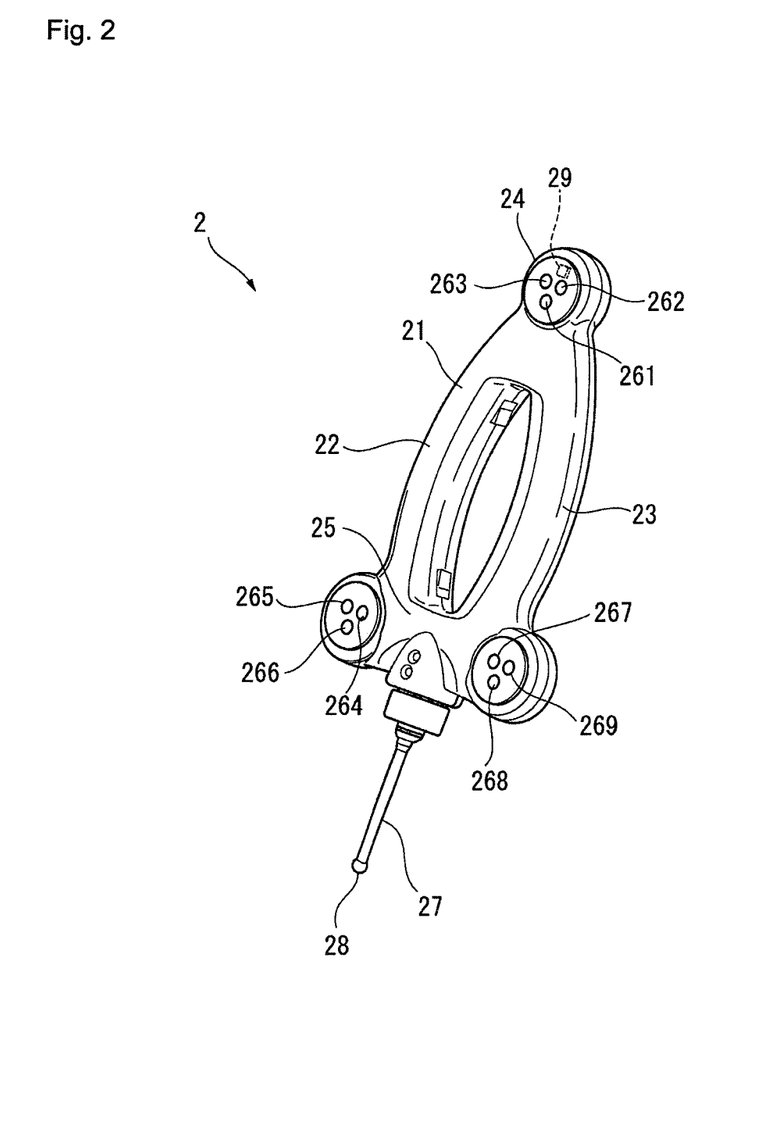
FIG. 2 is a perspective view of a probe configuring the coordinate measuring system.

As shown in FIG. 2, the probe 2 includes a probe main body 21 capable of being held by an operator and moved to a desired position, and a stylus 27 integrally provided to the probe main body 21. The probe main body 21 includes two arms 22 and 23 curving in a bowed shape such that first ends of each of the arms 22 and 23 are joined and second ends thereof bend progressively away from each other before rejoining, enabling the operator to grasp the probe main body 21 in both hands. In a front view of the probe main body 21, three infrared LEDs (light-emitting diodes) are provided to each of a first end joined portion 24 of the arms 22 and 23 and two lateral portions flanking a second end joined portion 25 of the arms 22 and 23, the first to third infrared LEDs 261 to 263, fourth to sixth infrared LEDs 264 to 266, and seventh to ninth infrared LEDs 267 to 269 serving as measurement light sources. Specifically, a total of nine infrared LEDs (first to ninth infrared LEDs 261 to 269) are arranged on the probe main body 21. The stylus 27 is provided projecting from the second end joined portion 25 of the arms 22 and 23 on the probe main body 21, the stylus 27 projecting in an opposite direction from the first end joined portion 24. A ball-type contact head 28 is provided to a tip of the stylus 27. In this way, the first to ninth infrared LEDs 261 to 269 and the contact head 28 are arranged in a predetermined positional relationship relative to the probe main body 21. Therefore, coordinates of the contact head 28 can be found by obtaining coordinates of the first to ninth infrared LEDs 261 to 269.

Figure 3:
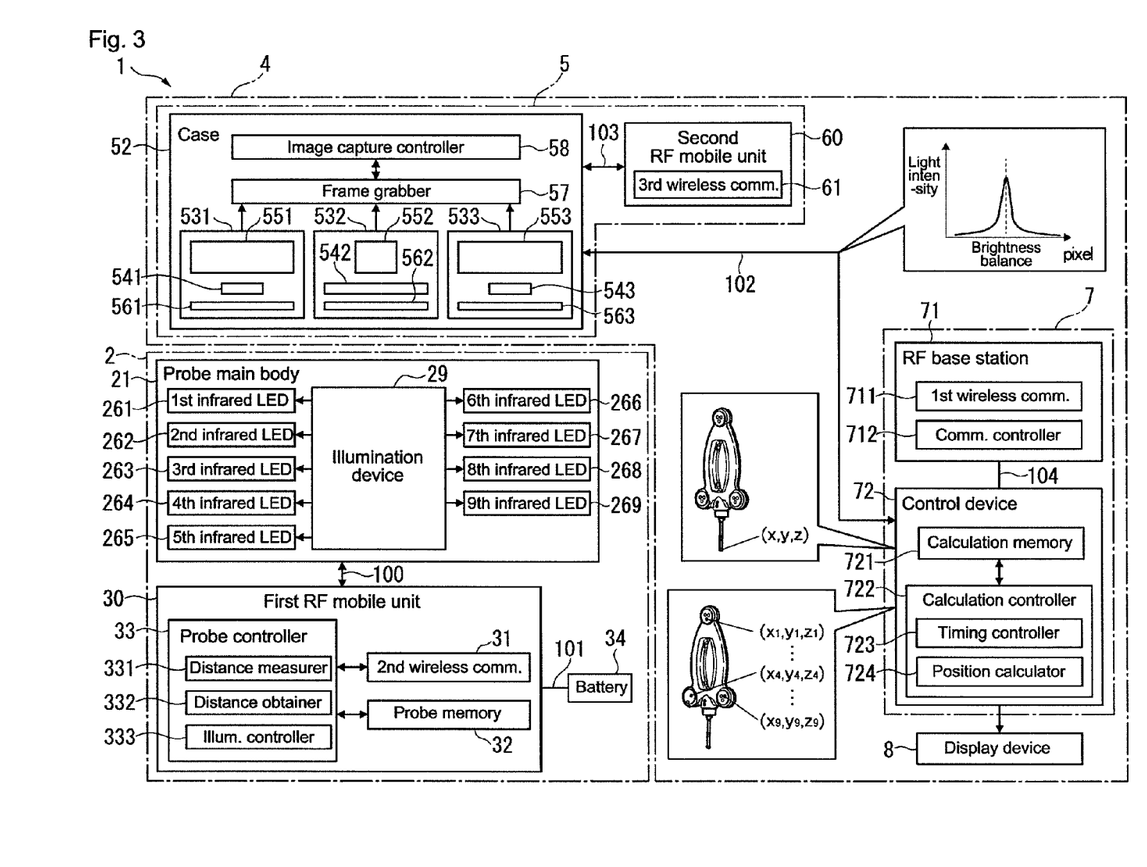
FIG. 3 is a block diagram of the coordinate measuring system.

In addition, as shown in FIGS. 2 and 3, the probe 2 includes an illumination device 29 provided in an interior of the probe main body 21; a first RF (radio frequency) mobile unit 30 connected to the probe main body 21 via a cable 100; and a battery 34 connected to the first RF mobile unit 30 via a cable 1 to serve as a power supply.

The first RF mobile unit 30 includes a second wireless communication portion (or communicator) 31, a probe memory 32, and a probe controller 33. The second wireless communication portion 31 is configured to be capable of wireless communication between a third wireless communication portion 61 (or communicator, described below) provided to the image capture apparatus 5 and a first wireless communication portion 711 (or communicator, described below) provided to the calculation control device 7. The probe controller 33 is configured by a CPU (central processing unit) processing programs and data stored in the probe memory 32. The probe controller 33 includes a distance measurer 331, a distance obtainer 332, and an illumination controller 333.

Figure 4:
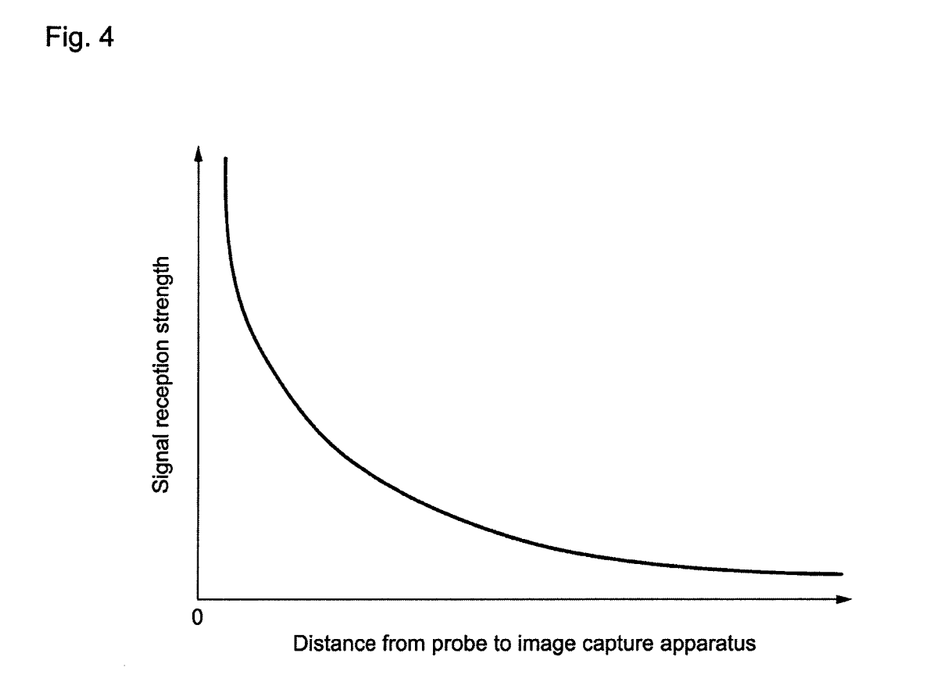
FIG. 4 is a graph illustrating a relationship between a signal reception strength of a measurement signal from the probe and a distance from the probe configuring the coordinate measuring system to an image capture apparatus.

The distance measurer 331 detects signal reception strength of a measurement signal from the image capture apparatus 5 in the second wireless communication portion 31. The distance measurer 331 then measures a distance from the probe 2 to the image capture apparatus 5 (specifically, a distance from the probe main body 21 of the probe 2 to a case 52 of the image capture apparatus 5) based on the signal reception strength and generates distance data representing the measurement results. In this example, the signal reception strength of the measurement signal in the second wireless communication portion 31 becomes stronger as the distance between the probe 2 and the image capture apparatus 5 decreases and becomes weaker as the distance increases, as shown in FIG. 4, for example. Based on the relationship illustrated in FIG. 4, and on the signal reception strength of the measurement signal in the second wireless communication portion 31, the distance measurer 331 measures the distance from the probe 2 to the image capture apparatus 5. The distance obtainer 332 obtains the distance data generated by the distance measurer 331.

The illumination controller 333 causes the first to ninth infrared LEDs 261 to 269 to illuminate in order, based on a pulse signal emitted from the calculation control device 7. Specifically, the illumination controller 333 obtains a reference illumination signal from the calculation control device 7 via the second wireless communication portion 31, the reference illumination signal serving as reference illumination time data indicating a reference amount of illumination time of the first to ninth infrared LEDs 261 to 269. The illumination controller 333 then corrects reference time data based on the distance in the distance data obtained by the distance obtainer 332. The illumination controller 333 transmits the correction results to the illumination device 29 via the cable 100, and the amount of illumination time of the first to ninth infrared LEDs 261 to 269 is controlled by the illumination device 29 based on the correction results. Details of a process performed by the illumination controller 333 are described hereafter.

The battery 34 is configured to be capable of movement to a desired position together with the probe main body 21 and the first RF mobile unit 30. The battery 34 supplies electric power to structural elements of the first RF mobile unit 30, including the second wireless communication portion 31 and the probe controller 33, and drives these elements. In addition, the battery 34 supplies electric power to structural elements in the probe main body 21, including the illumination device 29 and the first to ninth infrared LEDs 261 to 269, via the cables 100 and 101 and drives these elements. The battery 34 may be capable of charging, or incapable of charging.

Figure 5:
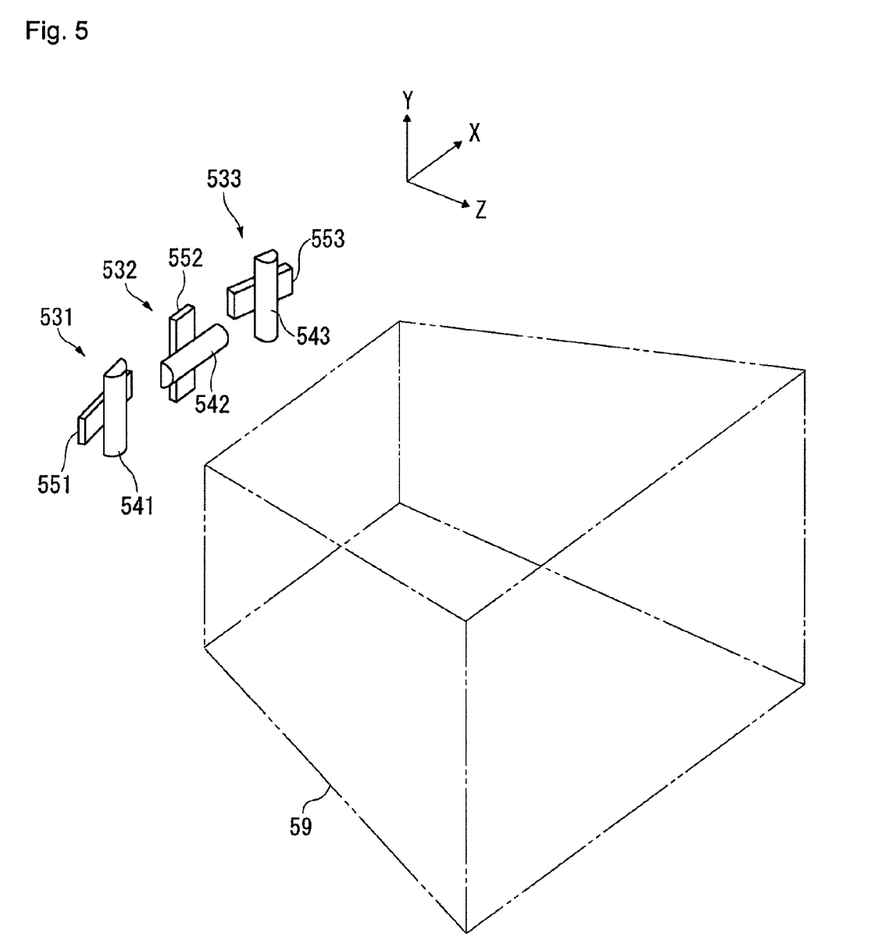
FIG. 5 is a perspective view of a main portion of detection portions configuring the coordinate measuring system.

The image capture apparatus 5, as shown in FIGS. 1 and 3, includes a tripod 51; a laterally long box-shaped case 52 supported substantially horizontally by the tripod 51; three detection portions 531, 532, and 533; a frame grabber 57; an image capture controller 58 also serving as a measurement signal transmitter; and a second RF mobile unit 60. The case 52 is connected to a control device 72 (described below) of the calculation control device 7 via a cable 102, and is connected to the second RF mobile unit 60 via a cable 103. The three detection portions 531, 532, and 533 are arranged at three positions (specifically, left, right, and center) on a front surface of the case 52, as also shown in FIG. 5. The detection portions 531 to 533 include cylindrical lenses 541 to 543, which collect incident light from a light collection region 59 onto a single axis; line sensors 551 to 553, which receive the light collected by the cylindrical lenses 541 to 543 and output a brightness distribution signal indicating a brightness distribution on the single axis; and shutters 561 to 563 controlling incidence of light on the cylindrical lenses 541 to 543. The line sensors 551 to 553 are configured by arranging CCDs (charge coupled devices) in a line, for example. Electronic shutters may also be used as the shutters 561 to 563.

In this example, in the detection portions 531 and 533, the line sensors 551 and 553 configure first line sensors arranged with a space therebetween. The line sensors 551 and 553 are orthogonal to a Y axis, which is orthogonal to an X axis (first axis) of the light collection region 59, and are inclined slightly inward with respect to the X axis. The cylindrical lenses 541 and 543 configure a first optical system. The cylindrical lenses 541 and 543 are arranged so as to be orthogonal to the line sensors 551 and 553 (parallel to the Y axis) at substantially a center position of the line sensors 551 and 553. In other words, the detection portions 531 and 533 are arranged so as to incline inward such that the detection portions 531 and 533 are oriented slightly toward the center detection portion 532. As a result, the incident light from the light collection region 59 is detected by the line sensors 551 and 553 as the first brightness distribution on the X axis. In addition, the line sensor 552 configures a second line sensor in the detection portion 532. The line sensor 552 is arranged so as to be parallel with the Y axis of the light collection region 59. The cylindrical lens 542 configures a second optical system. The cylindrical lens 542 is arranged so as to be orthogonal to the line sensor 552 (parallel to the X axis) at substantially a center position of the line sensor 552. As a result, the incident light from the light collection region 59 is detected by the line sensor 552 as a second brightness distribution on the Y axis. The shutters 561 to 563 are provided to each of the cylindrical lenses 541 to 543, respectively, on an opposite side from the respective line sensors 551 to 553. The frame grabber 57 obtains a light intensity profile (X axis: pixels; Y axis: light intensity) from a CCD element.

The image capture controller 58 is configured by a CPU processing programs and data stored in a memory (not shown in the drawings). The image capture controller 58 obtains a pulse signal emitted from the calculation control device 7 via the cable 102, and controls opening and closing of the shutters 561 to 563 of the detection portions 531 to 533 synchronized to the pulse signal. The image capture controller 58 then takes in an image from the line sensors 551 to 553 having open shutters 561 to 563 via the frame grabber 57 and transmits the image to the calculation control device 7 via the cable 102 as the brightness distribution signal. In this way, the brightness distribution signal is transmitted to the calculation control device 7 via the cable 102; therefore, transmission speed can be enhanced as compared to a configuration using wireless transmission. In addition, the image capture controller 58 transmits the measurement signal to the second wireless communication portion 31 via the second RF mobile unit 60.

The second RF mobile unit 60 includes the third wireless communication portion 61. The third wireless communication portion 61 is configured to be capable of wireless communication with the second wireless communication portion 31 provided to the probe 2.

Electric power to drive the structural elements within the case 52 is supplied from the control device 72 of the calculation control device 7 via the cable 102. In addition, electric power to drive the structural elements of the second RF mobile unit 60 is also supplied from the control device 72 via the cables 102 and 103.

The calculation control device 7 includes an RF (radio frequency) base station 71 and the control device 72, which is connected to the RF base station 71 via a cable 104. The RF base station 71 includes the first wireless communication portion 711 and a communication controller 712. The first wireless communication portion 711 is configured to be capable of wireless communication with the second wireless communication portion 31 provided to the probe 2. The communication controller 712 processes various kinds of signals and data output from the control device 72 and transmits the signals and data to the second wireless communication portion 31 via the first wireless communication portion 711. Electric power to drive the structural elements of the RF base station 71 is supplied from the control device 72 via the cable 104.

The control device 72 includes a calculation memory 721 and a calculation controller 722. The calculation controller 722 is configured by a CPU processing programs and data stored in the calculation memory 721. The calculation controller 722 includes a timing controller 723 as a reference time transmitter, and a position calculator 724. Electric power to drive the structural elements of the control device 72 is supplied from a commercial power source via a cable not shown in the drawings.

Simultaneously with the reference illumination signal, which causes the first to ninth infrared LEDs 261 to 269 of the probe 2 to illuminate, being emitted via the RF base station 71, the timing controller 723 emits a pulse signal to the image capture apparatus 5 via the cable 102 synchronized with the reference illumination signal, the pulse signal controlling intake of the brightness distribution signals of the line sensors 551 to 553 into the image capture apparatus 5.

The position calculator 724 calculates three-dimensional coordinates of the contact head 28 in the coordinate measuring system 1 based on the brightness distribution signals from the image capture apparatus 5. Specifically, the position calculator 724 uses a triangulation method to calculate the three-dimensional coordinates of the first to ninth infrared LEDs 261 to 269. The three-dimensional coordinates of the first to ninth infrared LEDs 261 to 269 can be obtained using a known method disclosed in Japanese Patent Laid-open Publication No. 2005-233759. The position calculator 724 then calculates the three-dimensional coordinates of the contact head 28 using the position of the probe 2 (three-dimensional coordinates of the first to ninth infrared LEDs 261 to 269) and position of the contact head 28 relative to the first to ninth infrared LEDs 261 to 269 of the probe 2. The three-dimensional coordinates of the contact head 28 correspond to position data according to the present invention. In addition, the position calculator 724 displays the measurement results of the three-dimensional coordinates of the contact head 28 on the display device 8.

Work Piece Measurement Process

Next, the work piece measurement process using the coordinate measuring system 1 is described. In the following, an exemplary case is described where the first RF mobile unit 30 is fixated to the probe main body 21 and the second RF mobile unit 60 is fixated to the case 52, and the distance from the second wireless communication portion 31 of the first RF mobile unit 30 to the third wireless communication portion 61 of the second RF mobile unit 60 is substantially equal to the distance from the probe 2 to the image capture apparatus 5.

Figure 6:
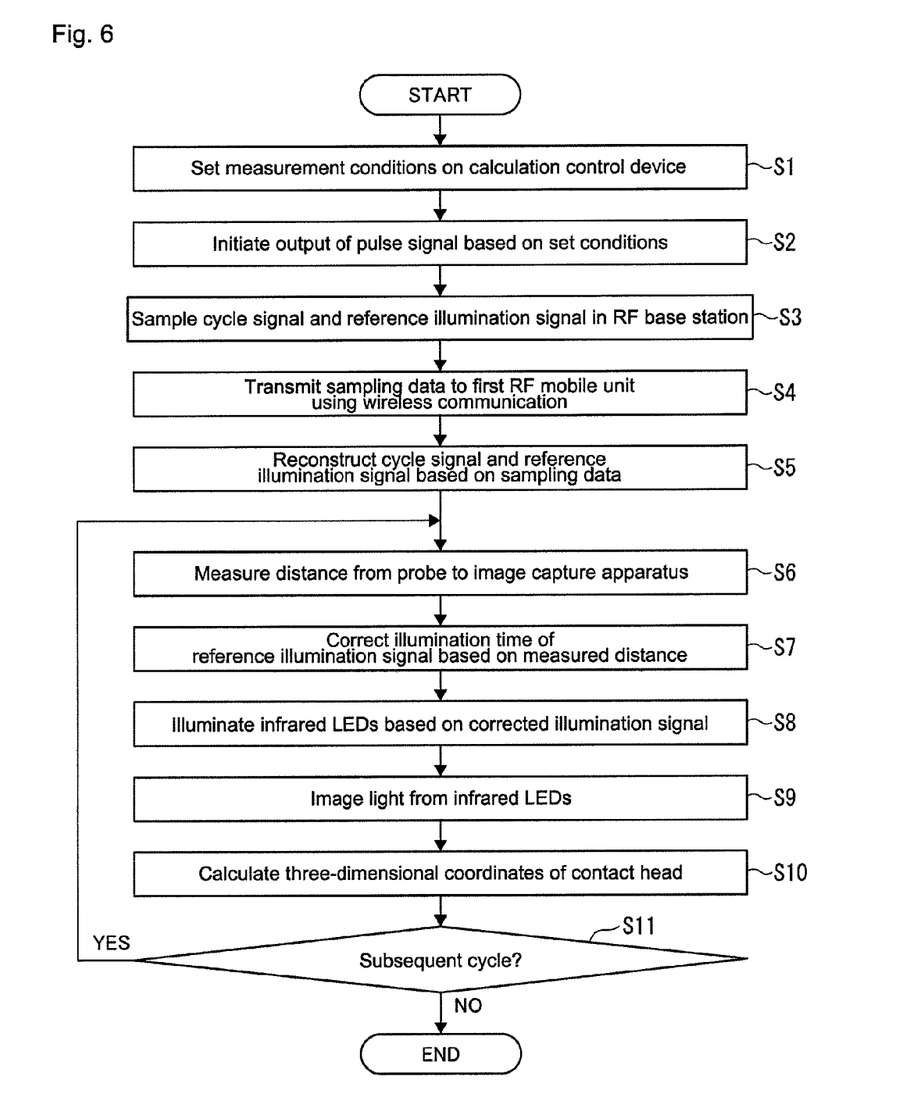
FIG. 6 is a flowchart illustrating a work piece measurement process that uses the coordinate measuring system.
Figure 7A:
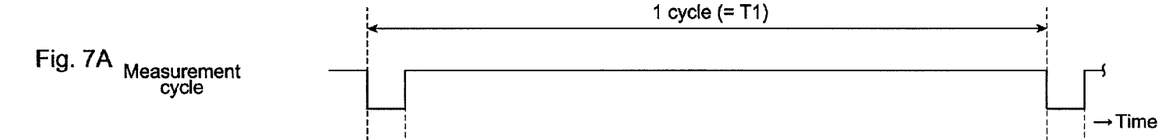
FIGS. 7A-7E each illustrate a pulse signal emitted from a calculation control device in the work piece measurement process.
Figure 7B:
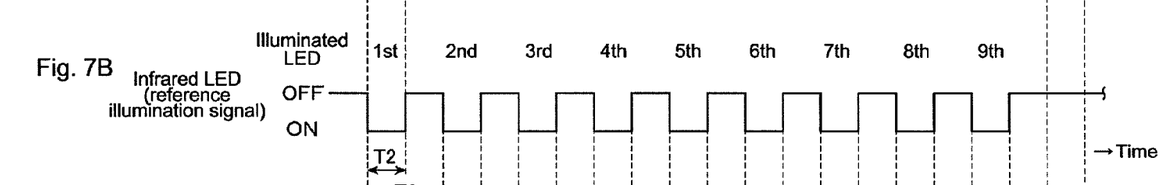

First, as shown in FIG. 6, the operator sets measurement conditions on the control device 72 of the calculation control device 7 using a computer or the like not shown in the drawings (step S1). Examples of the measurement conditions can include, for the first to ninth infrared LEDs 261 to 269, an illumination cycle, illumination time, number of LEDs illuminated (in a case where this differs according to the subject of control), or image capture timing for the image capture apparatus 5. After this, in a state where the operator has brought the contact head 28 of the probe 2 into contact with a measurement site on the work piece, the operator presses a measurement switch (not shown in the drawings) provided to the probe 2. When the operator presses the measurement switch, the timing controller 723 of the control device 72 initiates output of a pulse signal based on the measurement conditions (step S2). Specifically, the timing controller 723 outputs pulse signals to the RF base station 71 via the cable 104, a first pulse signal representing a measurement cycle (cycle signal), as shown in FIG. 7A, and a second pulse signal causing the first to ninth infrared LEDs 261 to 269 to illuminate (turn on/off) in order (reference illumination signal), as shown in FIG. 7B. Moreover, the timing controller 723 outputs the cycle signal and a pulse signal opening and closing the shutters 561 to 563 of the image capture apparatus 5 (open/close signal) to the image capture apparatus 5 via the cable 102.

Figure 7C:
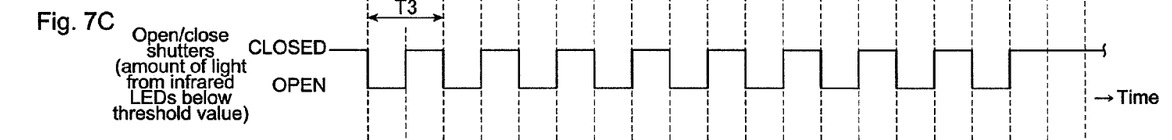
Figure 7D:
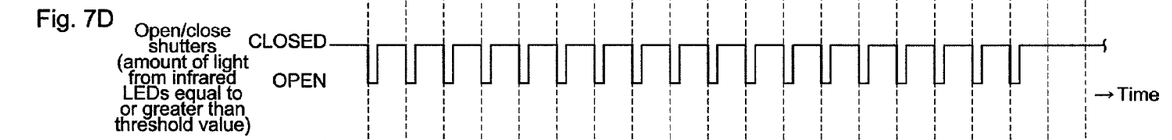

At this point, an illumination time T2 of the first to ninth infrared LEDs 261 to 269 in the reference illumination signal shown in FIG. 7B is defined to be long so as to enable light to be adequately accumulated in the detection portions 531 to 533 even in a case where the distance from the probe main body 21 of the probe 2 to the case 52 of the image capture apparatus 5 is a maximum measurement distance (for example, a maximum distance where light from the first to ninth infrared LEDs 261 to 269 can be received by the detection portions 531 to 533 of the image capture apparatus 5). Moreover, in a case where an amount of light incident on the image capture apparatus 5 from the first to ninth infrared LEDs 261 to 269 is less than a threshold value, as shown in FIG. 7C, the timing controller 723 may also transmit the open/close signal opening the shutters 561 to 563 for the same amount of time that the first to ninth infrared LEDs 261 to 269 are illuminated. Meanwhile, in a case where an amount of light incident on the image capture apparatus 5 is equal to or greater than the threshold value, as shown in FIG. 7D, the timing controller 723 may also transmit the open/close signal opening the shutters 561 to 563 for an amount of time shorter than the illumination time of the first to ninth infrared LEDs 261 to 269. As a configuration determining whether the amount of light incident on the image capture apparatus 5 from the first to ninth infrared LEDs 261 to 269 is less than the threshold value, the timing controller 723 may make a determination based on the measurement results from a light meter (not shown in the drawings), or the timing controller 723 may make a determination based on settings input by the operator using the computer or the like not shown in the drawings.

After this, the communication controller 712 of the RF base station 71 samples the cycle signal and the reference illumination signal obtained from the timing controller 723 (step S3). Specifically, the communication controller 712 measures a cycle time T1 of one measurement cycle, as shown in FIG. 7A; the illumination time T2 of each of the first to ninth infrared LEDs 261 to 269, as shown in FIG. 7B; and an illumination interval T3 from when a specific infrared LED illuminates until the next infrared LED illuminates. The communication controller 712 then generates sampling data related to these measurement results. The communication controller 712 then transmits the sampling data obtained by the sampling performed in step S3 to the first RF mobile unit 30 using wireless communication via the first wireless communication portion 711 (step S4).

After this, when the illumination controller 333 of the first RF mobile unit 30 receives the sampling data via the second wireless communication portion 31, the cycle signal shown in FIG. 7A and the reference illumination signal shown in FIG. 7B are reconstructed based on the sampling data (step S5) and are stored in the probe memory 32. The distance measurer 331 of the first RF mobile unit 30 then measures the distance from the probe 2 to the image capture apparatus 5 (step S6) and outputs the distance data to the distance obtainer 332. When the process of step S6 occurs, for example, the image capture controller 58 treats obtaining the cycle signal and the open/close signal from the control device 72 as a trigger and transmits the measurement signal to the first RF mobile unit 30 via the third wireless communication portion 61 using wireless communication. Based on the signal reception strength of the measurement signal in the second wireless communication portion 31, and on the relationship illustrated in FIG. 4, the distance measurer 331 measures the distance from the probe 2 to the image capture apparatus 5.

Figure 7E:
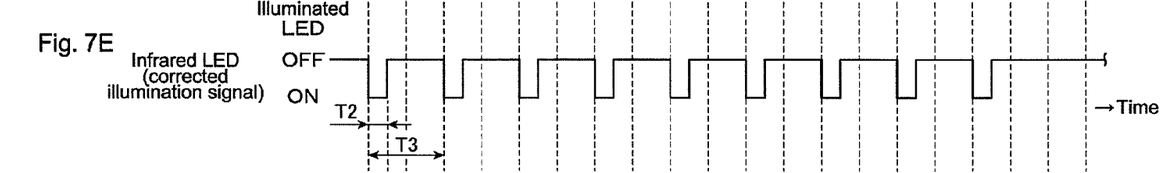
Figure 8:
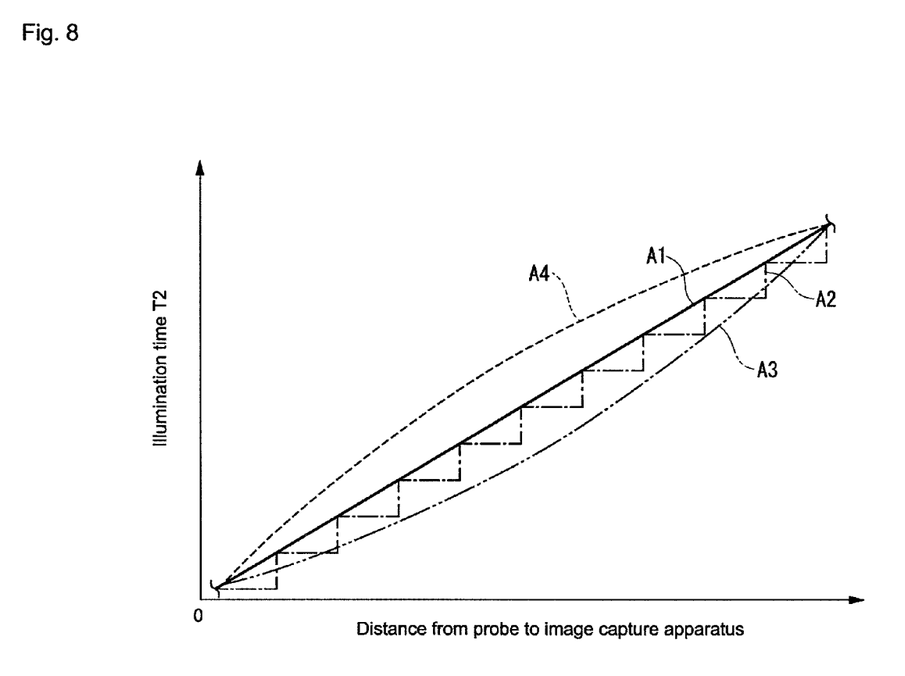
FIG. 8 is a graph illustrating a relationship between an illumination time and a distance from a probe to an image capture apparatus where the probe is used in generating a corrected illumination signal in the work piece measurement process.

Next, the illumination controller 333 of the first RF mobile unit 30 corrects the illumination time T2 of the reference illumination signal stored in the probe memory 32 based on the distance in the distance data (step S7) and stores a corrected illumination signal indicating the correction results in the probe memory 32. For example, in a case where the distance from the probe 2 to the image capture apparatus 5 is greater than a threshold value, the illumination controller 333 stores the reference illumination signal in the probe memory 32 as the corrected illumination signal without correcting the illumination time T2. Meanwhile, in a case where the distance is less than the threshold value, the illumination controller 333 corrects the reference illumination signal such that the illumination time T2 is reduced, and generates the corrected illumination signal. The illumination controller 333 then stores the corrected illumination signal as shown in FIG. 7E, for example, in the probe memory 32. A relationship between the distance and the illumination time T2 in the case where the illumination time T2 is reduced may be a relationship expressed by any of a straight line A1, a bent line A2, a curved line A3, and a curved line A4 in FIG. 8.

After this, the illumination controller 333 outputs the corrected illumination signal to the illumination device 29 via the cable 100, synchronizes with the corrected illumination signal, and illuminates the first to ninth infrared LEDs 261 to 269 in order (step S8). At substantially the same point in time as step S8 and based on the cycle signal, the image capture controller 58 synchronizes with the open/close signal to simultaneously open and close the shutters 561 to 563 and capture the light from the first to ninth infrared LEDs 261 to 269 (step S9). Using such a process, the brightness distribution signal is detected in the detection portions 531 to 533 of the image capture apparatus 5 based on the light from the first to ninth infrared LEDs 261 to 269. The image capture controller 58 then transmits the brightness distribution signal to the control device 72 of the calculation control device 7 via the cable 102.

When the brightness distribution signal is received, the position calculator 724 of the control device 72 calculates the three-dimensional coordinates of the contact head 28 (step S10). As a result, the coordinates can be found for the measurement site where the contact head 28 of the probe 2 is in contact with the work piece. Moreover, at least one correction may be performed on the three-dimensional coordinates obtained in step S10, the correction being at least one of spatial accuracy correction and temperature correction (correction eliminating an effect of thermal expansion or displacement of the line sensors 551 to 553 due to temperature, for example). After this, the illumination controller 333 determines whether there is a subsequent cycle based on the cycle signal (step S11). In a case where the illumination controller 333 determines that there is a subsequent cycle, the illumination controller 333 performs the processing of step S6. In a case where the illumination controller 333 determines that there is no subsequent cycle, the process ends.

Effect of the Embodiment

According to the present embodiment, the probe 2 obtains distance data for the distance from the probe 2 (first to ninth infrared LEDs 261 to 269) to the image capture apparatus 5 and controls the illumination time T2 of the first to ninth infrared LEDs 261 to 269 based on the distance represented by the distance data. The calculation control device 7 then calculates position data of the probe 2 based on the first and second brightness distributions detected by the image capture apparatus 5. Therefore, in a case where the distance from the probe 2 to the image capture apparatus 5 is less than a threshold value and the intensity of light received in the image capture apparatus 5 is greater than in a case where the distance is equal to or greater than the threshold value, the illumination time T2 of the first to ninth infrared LEDs 261 to 269 is made shorter than in the case where the distance is equal to or greater than the threshold value. As a result, after the image capture apparatus 5 has received an amount of light necessary for the calculation of the position data, the first to ninth infrared LEDs 261 to 269 can be turned off. Accordingly, power consumption by the first to ninth infrared LEDs 261 to 269 can be inhibited.

In addition, electric power is supplied to the structural elements of the probe 2 by the battery 34, which is capable of being moved to a desired position. Further, the probe 2 corrects the reference illumination signal received from the calculation control device 7 via wireless communication based on the distance represented by the distance data, and the illumination time of the first to ninth infrared LEDs 261 to 269 can be controlled based on the correction results. Therefore, by correcting the reference illumination signal in the probe 2, a processing load on the calculation control device 7 can be reduced. In addition, electric power is supplied to the probe 2 by the battery 34, which is capable of being moved, and the reference illumination signal is transmitted and received between the calculation control device 7 and the probe 2 using wireless communication. Therefore, the position of the probe 2 relative to the calculation control device 7 can be freely adjusted within a range where wireless communication is possible, enabling work pieces having various sizes and shapes to be measured. Moreover, the power consumption of the battery 34 can be inhibited, and frequency of charging or swapping out the battery 34 can be minimized.

Moreover, the probe 2 measures the distance from the probe 2 to the image capture apparatus 5 based on the signal reception strength of the measurement signal transmitted and received between the probe 2 and the image capture apparatus 5. Therefore, the illumination time T2 of the first to ninth infrared LEDs 261 to 269 can be appropriately controlled based on accurate measurement results. In addition, the second wireless communication portion 31 used in receiving the reference illumination signal is also used in receiving the measurement signal. As a result, the second wireless communication portion 31 can be effectively utilized, and the configuration of the probe 2 can be simplified. Moreover, there is no need for the operator to measure the distance from the probe 2 to the image capture apparatus 5, and a work burden on the operator can be alleviated.

Modifications

Moreover, the present invention is not limited to the above-described embodiment, and includes modifications and improvements within a scope capable of achieving the advantages of the present invention.

Figure 9:
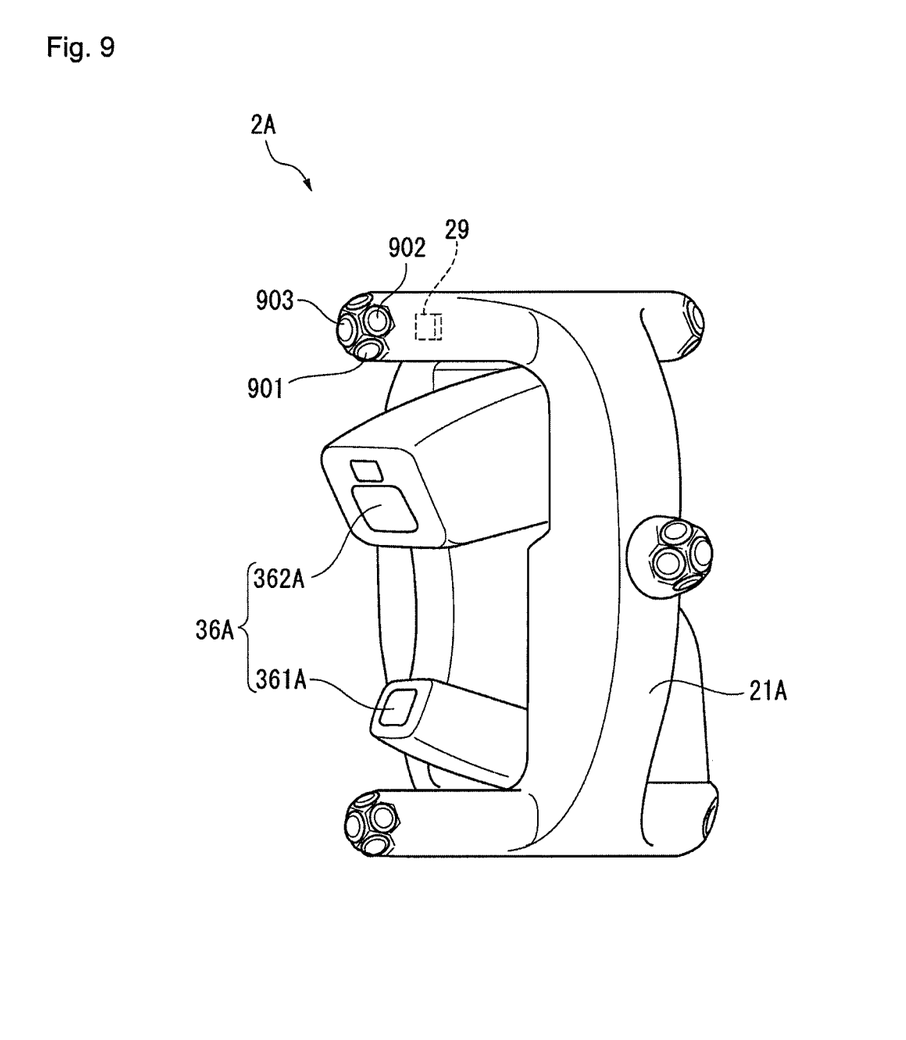
FIG. 9 is a perspective view of a probe according to to a modified example of the present invention.

Specifically, the contact-type probe 2 having the contact head 28 on the tip thereof was described as an example of the probe according to the present invention; however, the probe is not limited to this and may also be a non-contact-type probe. For example, as shown in FIG. 9, a non-contact probe 2A has a configuration in which a non-contact measuring device 36A is installed in a probe main body 21A, the measuring device 36A including a light emitter 361A emitting light toward a work piece; a light receiver 362A receiving light reflected from the work piece; and a calculator (not shown in the drawings) calculating position data for the position of the work piece relative to the probe main body 21A using a position where light is received in the light receiver 362A. In addition, the probe 2A includes the illumination device 29, the first RF mobile unit 30 (not shown in the drawings), forty infrared LEDs 901, 902, 903, etc., and the battery 34 (not shown in the drawings) supplying electric power to the structural elements of the probe 2A. In this case, the position calculator 724 of the calculation control device 7 finds the coordinates of a light firing position of the non-contact measuring device 36A based on the position of the probe 2A, which is found based on image capture results of the infrared LEDs using the image capture apparatus 5, and the position of a measurement point, which is found by the non-contact measuring device 36A. Moreover, in the non-contact-type probe 2A, there is no need to make contact with the work piece, which enables measurement of work pieces having more complex shapes. To achieve this, a greater number of infrared LEDs (for example, the forty infrared LEDs 901, 902, 903, etc.) are installed in the probe 2A in order to enable detection of a variety of postures assumed by the probe 2A. However, not all of the infrared LEDs need to be capable of performing detection in order to detect the posture of the probe 2A. So long as at least three infrared LEDs are capable of performing detection, the posture of the probe 2A can be found. Furthermore, the probe of the present invention is not limited to a probe; a known device, known object, or the like can instead be used as an object to be measured.

An exemplary configuration was described in which a distance obtainer and illumination controller according to the present invention were provided to the probe 2. However, the distance obtainer and illumination controller may also be to the calculation control device 7. For example, the distance obtainer 332 is provided to the control device 72 of the calculation control device 7, and the timing controller 723 is made to serve as the illumination controller according to the present invention, which generates the corrected illumination signal. In addition, during the work piece measurement process, the distance obtainer 332 of the control device 72 obtains distance data from the distance measurer 331 of the probe 2. The timing controller 723 then generates the corrected illumination signal based on the distance data and a relationship shown in FIG. 8 and transmits the corrected illumination signal to the probe 2. After this, the probe 2 may also control the illumination time T2 of the first to ninth infrared LEDs 261 to 269 based on the corrected illumination signal.

The distance from the probe 2 to the image capture apparatus 5 is measured based on the signal reception strength of the measurement signal transmitted and received between the probe 2 and the image capture apparatus 5; however, the following configuration is also possible. For example, the second RF mobile unit 60 is not provided to the image capture apparatus 5, and instead a measurement signal transmitter is provided to the control device 72 of the calculation control device 7, the measurement signal transmitter transmitting the measurement signal to the first RF mobile unit 30 via the RF base station 71. In addition, in such a configuration, the probe 2 first measures the distance from the probe 2 to the calculation control device 7 based on the signal reception strength of the measurement signal transmitted and received between the probe 2 and the calculation control device 7. After this, the distance measurer 331 of the probe 2 finds the distance from the probe 2 to the image capture apparatus 5 based on a positional relationship between the calculation control device 7 and the image capture apparatus 5 that was input into the distance measurer 331 ahead of time, and based on the measurement results of the distance from the probe 2 to the calculation control device 7. The illumination controller 333 may also generate the corrected illumination signal based on the measurement results of the distance. Moreover, this configuration may also have the distance obtainer (obtaining distance data) and the illumination controller (generating corrected illumination signal) according to the present invention be provided to the calculation control device 7. The calculation control device 7 may obtain the measurement data generated by the probe 2, generate the corrected illumination signal, and transmit the corrected illumination signal to the probe 2. In addition, the distance measurer (generating distance data based on the signal reception strength of the measurement signal transmitted and received between the probe 2 and the calculation control device 7) may also be provided to the calculation control device 7 in the present configuration.

In a case where the probe 2 or the calculation control device 7 generate a corrected illumination signal in which the illumination time T2 is shorter than in the reference illumination signal, an amount of time that the shutters 561 to 563 of the image capture apparatus 5 open may be made shorter so as to match the illumination time T2. In such a case, the image capture controller 58 of the image capture apparatus 5 may also obtain a correction notification signal, in which the first to ninth infrared LEDs 261 to 269 are controlled such that the illumination time T2 is shorter, and the image capture controller 58 may also make the amount of time that the shutters 561 to 563 open shorter. In addition, the timing controller 723 of the calculation control device 7 which obtained the correction notification signal may also correct the open/close signal; generate a corrected open/close signal in which the amount of time that the shutters 561 to 563 open is short; transmit the corrected open/close signal to the image capture apparatus 5; and the image capture controller 58 may shorten the amount of time that the shutters 561 to 563 open based on the corrected open/close signal.

In the above example, wireless communication is used when transmitting and receiving the reference illumination signal between the probe 2 and the calculation control device 7, and the battery 34 supplying electric power to the structural elements of the probe 2 is provided; however, transmission and reception of the reference illumination signal as well of power supply to the structural elements of the probe 2 may also be performed via a cable connecting the probe 2 and the calculation control device 7. Power consumption by the first to ninth infrared LEDs 261 to 269 can be inhibited by this configuration, as well.

The first RF mobile unit 30 and second RF mobile unit 60 may also be provided at positions away from the probe main body 21 and the case 52. In such a case, the distance measured based on the signal reception strength of the measurement signal may be corrected based on this separated positional relationship and the distance from the probe 2 to the image capture apparatus 5 found. The first RF mobile unit 30 may be arranged inside the probe main body 21, the second RF mobile unit 60 may be arranged inside the case 52, and the RF base station 71 may be arranged inside the control device 72. Transmission and reception of various signals between the image capture controller 58 and the control device 72 may also be performed, not via the cable 102, but instead using wireless communication between the first wireless communication portion 711 and the third wireless communication portion 61. In such a case, a battery or commercial power source is needed that supplies electric power to drive the structural elements inside the case 52. The distance obtainer 332 acquires the distance data obtained based on the signal reception strength of the measurement signal; however, the distance obtainer 332 may also be configured to acquire distance data that the operator inputs via settings and to acquire distance data based on results of measurements made with ultrasonic waves. A power supply in the present invention may also be a solar cell.

Nine infrared LEDs (the first to ninth infrared LEDs 261 to 269) are arranged as the measurement light source of the present invention; however, at least three infrared LEDs are sufficient. A known light source other than an LED can be used as the measurement light source of the present invention, and the light emitted can be a light other than infrared. The cylindrical lenses 541 to 543 and the line sensors 551 to 553 were configured as the detection portions 531 to 533; however, so long as an optical element is capable of collecting light from the light collection region 59 in a single axis direction, the optical element need not be a cylindrical lens.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A coordinate measuring system having a probe provided with a measurement light source and being movable to a desired position, and further having a position detector configured to receive light from the measurement light source and to detect the position of the probe, the position detector comprising:

an image capturer comprising:
a pair of first optical systems separate from each other and configured to collect the light from the measurement light source on a first axis;
a pair of first line sensors configured to receive the light collected on the first axis by the respective pair of first optical systems, and further configured to detect a first brightness distribution on the first axis;
a second optical system configured to collect light from the measurement light source on a second axis orthogonal to the first axis; and
a second line sensor configured to receive the light collected on the second axis by the second optical system, and further configured to detect a second brightness distribution on the second axis; and
a calculation controller comprising a position calculator configured to calculate position data representing the position of the probe based on the first brightness distribution and the second brightness distribution, wherein:
one of the probe and the calculation controller further comprises:
a distance obtainer configured to acquire distance data for a distance from the probe to the image capturer; and
an illumination controller configured to control an illumination time of the measurement light source based on the distance represented by the distance data.

2. The coordinate measuring system according to claim 1, wherein:
the calculation controller comprises:
a first wireless communicator; and
a reference time transmitter configured to transmit, via the first wireless communicator, reference illumination time data representing a reference amount of time to illuminate the measurement light source,
the probe comprises:
a second wireless communicator;
a power supply movable to a predetermined position;
the distance obtainer; and
the illumination controller,
the power supply is configured to supply electric power to the measurement light source, the second wireless communication portion, the distance obtainer, and the illumination controller, and
the illumination controller configured to obtain the reference illumination time data via the second wireless communicator; correct the reference illumination time based on the distance represented by the distance data; and control the illumination time of the measurement light source based on the correction results.

3. The coordinate measuring system according to claim 2, wherein:
the image capturer comprises:
a third wireless communicator; and
a measurement signal transmitter configured to transmit the measurement signal via the third wireless communicator, and
the probe comprises a distance measurer configured to measure a distance from the probe to the image capturer, and further configured to generating the distance data based on the signal reception strength of the measurement signal in the second wireless communicator.

4. A coordinate measuring method utilizing a probe provided with a measurement light source and capable of being moved to a desired position, and a position detection apparatus receiving light from the measurement light source and detecting the position of the probe, the method comprising:
configuring the position detection apparatus with an image capture apparatus and a calculation controller;
providing the image capture apparatus with:
a pair of first optical systems provided so as to be separated from each other and collecting the light from the measurement light source on a first axis;
a pair of first line sensors receiving the light collected on the first axis by the pair of first optical systems and detecting a first brightness distribution on the first axis;
a second optical system collecting light from the measurement light source on a second axis orthogonal with respect to the first axis; and
a second line sensor receiving the light collected on the second axis by the second optical system and detecting a second brightness distribution on the second axis; and
causing one of the probe and the calculation controller to acquire distance data for a distance from the probe to the image capture apparatus; control an illumination time of the measurement light source based on the distance represented by the distance data; and calculate position data representing the position of the probe based on the first brightness distribution and the second brightness distribution.

5. A probe provided with a measurement light source and capable of being moved to a desired position, the probe comprising:
a second wireless communication portion configured for wireless communication with a first wireless communication portion provided to a calculation controller;
a power supply movable to a desired position;
a distance obtainer configured to acquire distance data for a distance from the probe to an image capturer; and
an illumination controller configured to control an illumination time of the measurement light source based on a distance represented by the distance data, wherein:
the power supply is configured to supply electric power to the measurement light source, the second wireless communication portion, the distance obtainer, and the illumination controller, and
the illumination controller obtains, via the second wireless communication portion, reference illumination time data transmitted from the first wireless communication portion and representing a reference amount of time to illuminate the measurement light source; corrects the reference illumination time based on the distance represented by the distance data; and controls the illumination time of the measurement light source based on the correction results.

\* \* \* \* \*